Jan. 29, 1952  H. E. DAEBELLIEHN  2,583,932
FUEL TANK FOR CAPTIVE MODEL AIRPLANES
Filed April 22, 1950
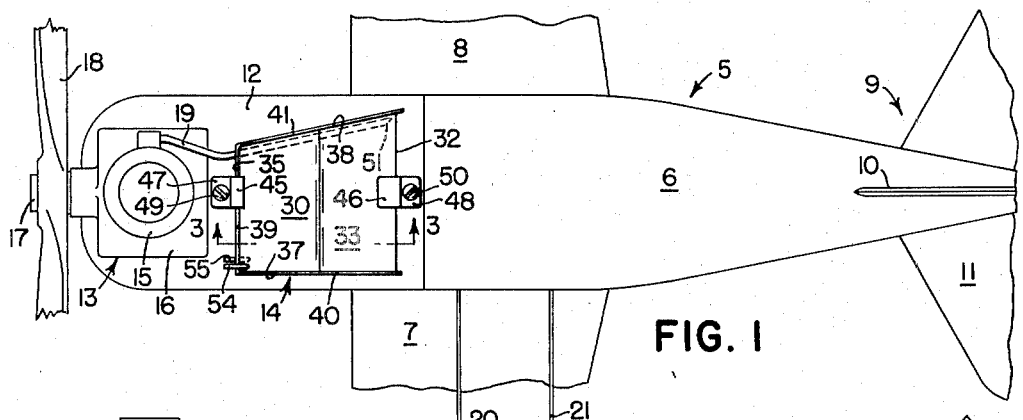
FIG. 1
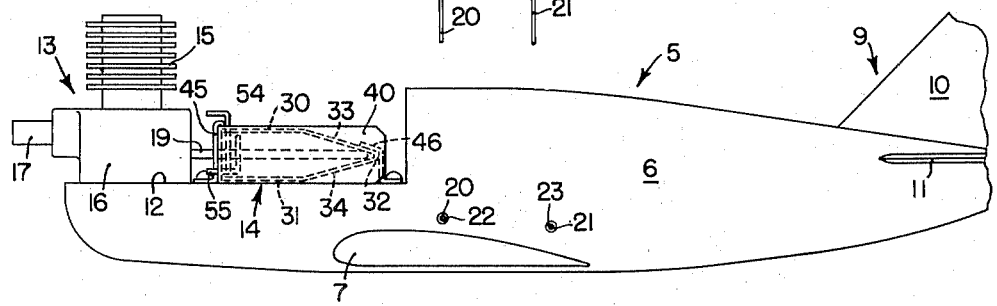
FIG. 2
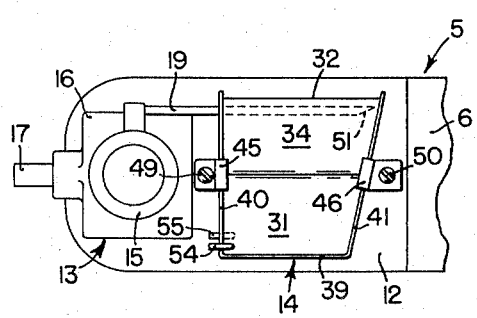
FIG. 4
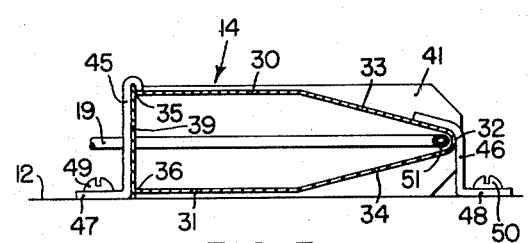
FIG. 3
INVENTOR.
HAROLD E. DAEBELLIEHN
BY 
ATTORNEY Patented Jan. 29, 1952

2,583,932

UNITED STATES PATENT OFFICE 2,583,932

FUEL TANK FOR CAPTIVE MODEL AIRPLANES

Harold E. Daebelliehn, Moline, Ill.

Application April 22, 1950, Serial No. 157,489

7 Claims. (Cl. 220—4)

The present invention relates generally to model airplanes of the captive type, in which the airplane, propelled by an internal combustion engine, flies in a circle about the operator, who controls the movement of the airplane by means of strings. More particularly, my invention relates to the fuel tank in which is stored the fuel for the propelling engine. The tank is positioned directly behind the engine and supplies fuel to the latter through a fuel delivery pipe. Inasmuch as the captive type airplane always flies in a circular path, the radius of which is equal to the length of the control strings, centrifugal force throws the fuel to the outer side of the tank, hence it is well known to those skilled in the art that the inlet opening in the fuel pipe should be positioned in the outer side of the tank. It is, of course, desirable to maintain a steady flow of fuel to the engine down to the last drop of fuel, but heretofore it has been found that when the tank is nearly empty, the engine begins to sputter and run in spurts because of interruptions in fuel flow.

One of the principal objects of my invention, therefore, relates to the provision of a fuel tank which insures a steady flow of fuel to the engine until the fuel in the tank is entirely consumed, regardless of whether the airplane is operated in level flight or maneuvered in violent areobatics. In the accomplishment of this object, I have designed a fuel tank having an outwardly and rearwardly inclined outer side wall. When fuel is thrown outwardly against this outer wall by centrifugal force, the inclination of the wall directs the fuel to the outer rear corner of the tank, at which corner is located the intake end of the fuel delivery pipe. The centrifugal force is sufficient to hold the fuel in this outer rear corner in spite of vertical movement of the airplane, either up or down.

Another object of my invention has to do with the provision of a novel and improved fuel tank which is simpler to construct and which is stronger and more durable in operation. A related object has to do with the provision of a fuel tank constructed of only two pieces of sheet material, rather than three, as is customary.

A further object relates to the provision of a fuel tank having converging top and bottom walls, but which has a stable support for the tank regardless of the position in which it is mounted in the airplane. This contributes greatly to the ease of mounting the tank and encourages ingenuity in designing airplanes of widely differing models and types.

These and other objects and advantages of my invention will be apparent to those skilled in the art after a consideration of the following description in which reference is had to the drawings appended hereto, in which Figure 1 is a fragmentary top plan view of a model airplane, showing a fuel tank embodying the principles of the invention;

Figure 2 is a side elevational view of the airplane and fuel tank;

Figure 3 is a sectional elevational view of the fuel tank, taken along a line 3—3 in Figure 1 and drawn to an enlarged scale; and Figure 4 is a top plan view of the front end of an airplane showing the fuel tank disposed in a different position.

Referring now to the drawings and more particularly to Figures 1, 2 and 3, the airplane is indicated in its entirety by reference numeral 5 and comprises a fuselage 6, an inner wing 7, an outer wing 8 and a tail assembly 9 including a stabilizer 10 and an elevator 11. The forward end of the fuselage is provided with a generally horizontal platform 12, on which is mounted an internal combustion engine 13 and a fuel tank 14. The engine 13 can be of any conventional design but the engine illustrated is of the type having a single vertical cylinder 15 mounted on a crankcase 16, which rests on the platform 12, and having a forwardly extending crankshaft 17, on which is fixed a propeller 18. The engine is supplied with fuel from the tank 14 through a fuel delivery pipe 19.

The airplane 5 is controlled by a pair of control strings 20, 21, which enter the fuselage 6 through holes 22, 23, respectively, and are connected to control the elevator by means of suitable well-known linkage (not shown). The strings can be of any suitable length, such as 25 or 50 feet, the ends being held by the operator. Thus, the airplane 5 moves in a circle to the left, or clockwise, during normal flight, or it can be inverted during flight and flown in a clockwise direction, in a manner known to those skilled in the art.

The fuel tank 14 is formed of two pieces of sheet material, preferably metal. One piece is bent to form a pair of parallel, normally horizontal top and bottom walls 30, 31 which have portions 33, 34 that converge toward a narrow edge 32 at one end thereof. Both top and bottom walls 30, 31 have rear portions 33, 34 which are inclined in converging relation toward the edge 32, which is disposed in a plane that lies substantially midway between the planes of the top and bottom horizontal wall portions 30, 31.

Thus, the first piece of sheet metal includes the portions 30, 31, 32, 33, 34 defining the top and bottom and rear end or edge of the tank, the front edges 35, 36 of the piece being open and spaced apart in a vertical plane. The inner side edge 37 of the sheet lies in a vertical plane which is perpendicular to the transverse rear edge 32 and to the front edges 35, 36. The outer side edge 38 lies in a vertical plane which is inclined outwardly and rearwardly between the front edges 35, 36 and the rear end 32.

The other piece of sheet metal is generally U-shaped and is positioned in three vertical intersecting planes: a middle portion 39 extending across the front end of the tank between the front edges 35, 36 to form the front wall, an inner portion 40 extending rearwardly in the plane of the inner edge 37, and an outer portion 41 extending rearwardly and outwardly in the plane of the outer edge 38. Thus, the second piece of sheet metal forms the front and the inner and outer sides of the tank.

The two pieces of sheet metal are joined and sealed along the edges 35, 36, 37, 38 at the intersection of the planes of these edges with the U-shaped piece 39, 40, 41 to form a fluid-tight container. The joining and sealing is preferably accomplished by soldering in a manner well known to those skilled in the art.

The top and bottom edges of the U-shaped piece lie in parallel horizontal planes spaced slightly above and below the planes of the top and bottom walls 30, 31 and extend throughout the length of the tank, thus providing a firm, stable support on a flat surface regardless of the position of the tank. For example, the tank can be positioned as in Figures 1, 2 and 3, or it can be inverted and turned through an angle of 90°, as illustrated in Figure 4.

The tank is rigidly secured in operating position on the platform 12 in any suitable manner, preferably by a pair of simple clips 45, 46 having flanges 47, 48 at their lower ends secured to the platform 12 by screws 49, 50. The fuel delivery pipe is inserted through a suitable aperture in the front wall 39 of the tank and is suitably soldered in position, with the intake opening 51 in the rear end of the pipe disposed in the outer rear corner of the tank, which is the corner at that end of the tank having the greater distance between the diverging side walls. The intake opening 51 is adjacent the vertex of the acute angle included between the outer wall 41 and the edge 32 along the rear end of the tank.

A pair of conventional vent tubes 54, 55 extend into the tank from the top and bottom thereof, respectively, and terminate inside the tank near the bottom and top thereof, respectively. The outer ends of the tubes are directed forwardly to receive air from forward movement of the airplane as is known to those skilled in the art.

In operation, centrifugal force tends to force the fuel in the tank against the outer wall 41. The outward and rearward inclination of this wall directs the fuel toward the outer rear corner of the tank where is located the intake 51 of the fuel delivery pipe 19. The converging rear portions 33, 34 of the top and bottom tank walls influence the flow of fuel toward the intake 51, in either normal or inverted position of the airplane, thus concentrating the fuel in the immediate vicinity of the intake 51 as long as any fuel is left in the tank. This prevents the fuel from moving away from the intake due to violent maneuvers of the airplane, which is the cause of interruptions in operation of the engine when conventional shapes of fuel tanks are employed.

In the arrangement of Figure 4, the tank is mounted in inverted position, with the top and bottom wall portions 34, 33 converging toward the edge 32 disposed parallel to the direction of flight on the outer side of the airplane. The two side walls 39, 40, which are at right angles to each other, are disposed as the inner and front walls, respectively, and the rear wall 41 is inclined outwardly and rearwardly. In this embodiment, the fuel delivery pipe extends from the intake opening at the outer rear corner of the tank, forwardly along the edge 32.

With the arrangement of Figure 4, the fuel is urged by centrifugal force toward the outer edge 32 of the tank, although the position of this edge generally parallel to the path of movement does not provide any component of force urging the fuel rearwardly. However, during violent aerobatics, the force of gravity acting on the fuel during steep climbs and the inertia of the fuel during steep power dives at a high rate of acceleration both tend to urge the fuel rearwardly against the rearwardly and outwardly inclined rear wall 41, which aids in directing the fuel out to the inlet 51 at the outer rear corner of the tank.

I do not intend my invention to be limited to the particular details shown and described herein, except as limited in the claims which follow.

I claim:

1. A fuel tank for a captive model airplane, said tank having a pair of top and bottom walls converging toward one end thereof and a pair of side walls diverging toward said one end, and a fuel delivery pipe connected to said tank and having an inlet opening adjacent the vertex of the acute angle at one corner of the tank between one of said side walls and said one end thereof.

2. A fuel tank for a model airplane, said tank comprising a single piece of sheet material forming the top and bottom thereof converging toward an edge along one end of the tank disposed above the plane on which the tank normally rests, and another single piece of sheet material of U-shape forming the opposite end and the two sides adjacent thereto, the bottom edge of the last mentioned piece being disposed in a plane substantially coextensive with the length of the tank, to provide supports therefor alongside that portion of the bottom above the plane on which the tank rests, and means for joining and sealing said two pieces of material along their lines of intersection to form a fluid-tight container.

3. A fuel tank for a model airplane, said tank comprising a single piece of sheet material forming the top and bottom thereof converging toward an edge along one end of the tank, and another single piece of sheet material of U-shape forming the opposite end and the two sides adjacent thereto, the top and bottom edges of said U-shaped piece being disposed in substantially parallel planes coextensive with the length of the tank, and means for joining and sealing said two pieces of material along their lines of intersection to form a fluid-tight container.

4. A fuel tank for a captive model airplane, said tank comprising a single piece of sheet material forming the top and bottom and one end thereof, a part of the bottom being inclined upwardly adjacent said one end, the side edges of said piece lying in substantially vertical planes converging toward the opposite open end, and a second single piece of sheet material forming the other end and the two sides, said second piece having a middle portion closing said open end of said first piece and the two ends of said second piece diverging and lying in said converging vertical planes the bottom edge of said second piece extending below the bottom portion of said first piece to form a support for said tank coextensive therewith and alongside the inclined bottom portion, and means for joining and sealing said two pieces of material along their lines of intersection to form a fluid-tight container.

5. The fuel tank claimed in claim 4, including the further provision that one of said sides is substantially perpendicular to said other end and the other side is disposed at an obtuse angle thereto.

6. The fuel tank claimed in claim 5, including the further provision of a fuel delivery pipe having an inlet opening positioned in the corner of said tank at the intersection of said other side and said one end thereof.

7. A fuel tank for a captive model airplane, said tank comprising a single piece of sheet material forming the top and bottom thereof converging toward an edge along one end of the tank, the side edges of said piece lying in substantially vertical planes converging toward the opposite open end, and a second single piece of sheet material forming the other end and the two sides, said second piece having a middle portion closing said open end of said first piece and the two ends of said second piece diverging and lying in said converging vertical planes, the top and bottom edges of said second piece being disposed in substantially parallel planes coextensive with the length of the tank, and means for joining and sealing said two pieces of material along their lines of intersection to form a fluid-tight container.

HAROLD E. DAEBELLIEHN.

REFERENCES CITED

The following references are of record in the file of this patent:

UNITED STATES PATENTS

| Number | Name | Date |
|---|---|---|
| 881,418 | Kruse | Mar. 10, 1908 |
| 1,075,369 | Millice | Oct. 14, 1913 |
| 1,500,559 | Hammond | July 8, 1924 |
| 1,724,378 | Stokstad | Aug. 13, 1929 |
| 2,138,301 | Howie | Nov. 29, 1938 |
| 2,234,758 | Goldberg | Mar. 11, 1941 |
| 2,373,221 | Blaylock et al. | Apr. 10, 1945 |
| 2,392,902 | Crawford | Jan. 15, 1946 |
| 2,421,225 | Stensgaard | May 27, 1947 |

FOREIGN PATENTS

| Number | Country | Date |
|---|---|---|
| 9,560 | Great Britain | A.D. 1905 |
| 691,152 | Germany | May 17, 1940 |